United States Patent [19]

Shaw

[11] Patent Number: 5,590,527
[45] Date of Patent: Jan. 7, 1997

[54] MASTER CYLINDER WITH TIE ROD MOUNTED END PLATE

[75] Inventor: Schuyler S. Shaw, Dayton, Ohio

[73] Assignee: General Motors Corporation, Detroit, Mich.

[21] Appl. No.: 523,173

[22] Filed: Sep. 5, 1995

[51] Int. Cl.$^6$ .............. B60T 11/26; F15B 7/08; B01D 19/00
[52] U.S. Cl. .............. 60/585; 92/161
[58] Field of Search .............. 60/585, 586, 588, 60/589; 92/161, 128

[56] References Cited

U.S. PATENT DOCUMENTS

| | | | |
|---|---|---|---|
| 1,758,671 | 5/1930 | Loughead et al. | 60/586 |
| 1,889,857 | 12/1932 | Gardner | 92/161 X |
| 2,310,976 | 2/1943 | Masteller | 60/588 X |
| 2,564,137 | 8/1951 | Wahlberg | 60/588 |
| 2,615,304 | 10/1952 | Groves | 60/589 |
| 3,156,097 | 11/1964 | Brown | 92/161 X |
| 3,738,232 | 6/1973 | Kado | 92/161 |
| 4,280,326 | 7/1981 | Moodie | 60/593 X |
| 4,294,072 | 10/1981 | Flynn | 60/585 |
| 4,400,943 | 8/1983 | Belart | 60/562 X |
| 4,423,597 | 1/1984 | Spielmann | 60/562 X |
| 4,905,576 | 3/1990 | Reynolds | 92/161 X |

Primary Examiner—John E. Ryznic
Attorney, Agent, or Firm—Jeffrey A. Sedlar

[57] ABSTRACT

A brake master cylinder assembly wherein a rod transmits forces acting on the master cylinder to the vehicle structure resulting in a master cylinder assembly with greater design flexibility. This permits forming the master cylinder body as an extrusion that is slidably received within a fluid reservoir.

6 Claims, 4 Drawing Sheets

5,590,527

MASTER CYLINDER WITH TIE ROD MOUNTED END PLATE

BACKGROUND OF THE INVENTION

The present invention relates to brake master cylinders and more particularly, to manually actuated, power boosted hydraulic brake master cylinders for use in automotive applications.

A typical automotive master cylinder is connected in a hydraulic braking system with conduits carrying brake fluid between the master cylinder and either disc brake calipers or wheel cylinders at each vehicle wheel. Selective movement of primary and secondary pistons within the master cylinder develops elevated hydraulic pressure which is transmitted to the wheel cylinders or calipers. When an associating service brake pedal is depressed, force is transferred by a push-rod to the master cylinder primary piston which moves forward. Generally, the combination of hydraulic pressure and the force of a primary piston spring moves the secondary piston forward at the same time. When the pistons have moved forward past bypass holes in the master cylinder housing, fluid is displaced until the wheel brake linings make contact. Hydraulic pressure is then increased in the high pressure chambers of the master cylinder and is transmitted to the wheel brakes causing the brakes to be applied.

When the brake pedal is released fluid is forced back through the conduits to the master cylinder. Typical master cylinders include compensating ports through which fluid flows from the reservoir into the master cylinder during rapid brake releases. At the end of a brake release excess fluid exists in the hydraulic system due to displacement and compensation of fluid. This excess fluid returns to the reservoir through the by-pass holes of the master cylinder.

The master cylinder therefore, provides the function of responding to an application of force through a brake pedal to build pressure in the hydraulic braking system. Additionally, the master cylinder controls the flow of fluid between the brake hydraulic system and the reservoir.

A typical master cylinder is generally combined with an hydraulic or vacuum operating power booster assembly. The power booster assists in increasing the amount of force applied to the master cylinder's primary piston through the push-rod upon actuation of the brake pedal. Therefore, the master cylinder is generally constructed of a rigid structural material sufficient to carry the load imposed thereon by the push-rod. In order to carry the applied forces, master cylinder bodies have generally been constructed of cast iron or cast aluminum. A plastic reservoir is generally connected to the cast body.

SUMMARY OF THE INVENTION

A master cylinder in accordance with the present invention includes an extruded body having a bore for carrying the master cylinder pistons. The bore is closed on at least one end by a plate and is provided with a means of receiving a push rod. A fluid reservoir receives the extruded body and includes seals for bearing against the outside surfaces of the extruded body to provide a fluid-tight assembly.

The aforementioned reservoir and body assembly is mountable to a power assist unit or directly to a vehicle structural element by rods that pass through the end plate. The rods attach the master cylinder to a vehicle structural element and may pass through the power assist unit for supporting it as well. Input force to the master cylinder body is reacted to by the end plate which transfers the force to the rods. In this manner the master cylinder body itself is freed from the need to carry the applied forces which in turn increases flexibility in designing master cylinder assemblies.

Relieving the master cylinder body from the need to carry reaction forces according to a preferred aspect of the present invention provides the advantage of forming the body by extrusion methods. Further, the extruded body is adapted to be slidably and sealingly received within a formed reservoir thereby, simplifying assembly.

DETAILED DESCRIPTION OF THE PRESENTLY PREFERRED EMBODIMENT

Figure 1:
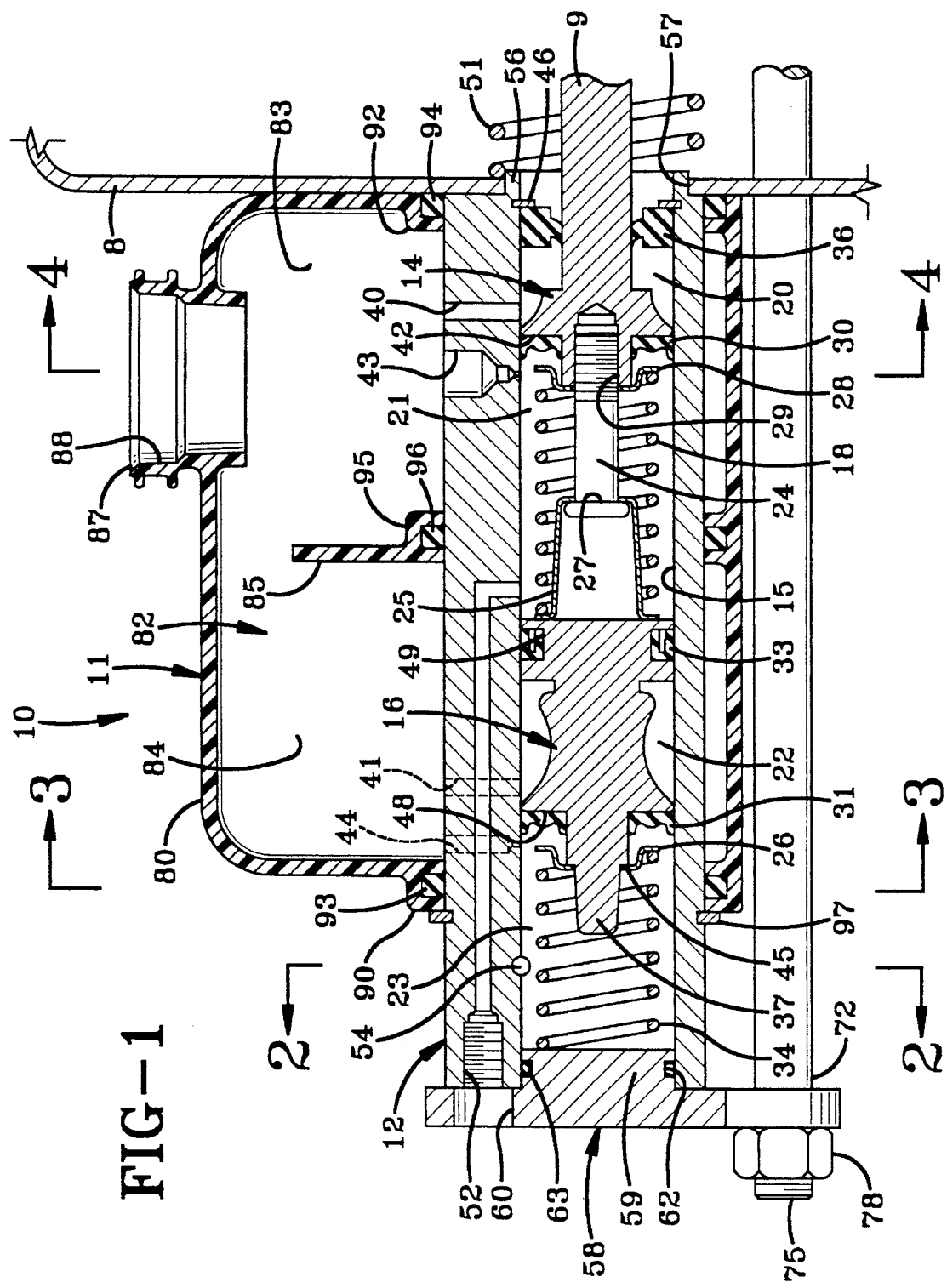
FIG. 1 is a cross sectional view of a master cylinder.

Referring to the drawings, illustrated in FIG. 1 is a cross-sectional view of a master cylinder 10 shown mounted on a power booster wall 8. Optionally, in accordance with the present invention, the master cylinder 10 is adaptable to be mounted directly to an independent vehicle structural element (not illustrated).

Master cylinder 10 is generally of the tandem piston type and incorporates features demonstrating aspects of the present invention. Master cylinder 10 includes extruded body 12 of an acceptably rigid material such as metal or plastic and in the present embodiment is aluminum. Body 12 is associated with a reservoir 11 for carrying a supply of braking fluid. A longitudinal bore 15 extends through body 12 and slidably carries the tandem piston arrangement including primary piston 14 and secondary piston 16.

Primary piston 14 separates adjacent areas of the bore 15 into primary low pressure chamber 20 and primary high pressure chamber 21. Secondary piston 16 separates adjacent areas of the bore 15 into secondary low pressure chamber 22 and secondary high pressure chamber 23.

The primary piston 14 is arranged in a subassembly that includes a spring retainer 28 which is slidably retained on a post 24 that extends from opening 29 of primary piston 14. A second spring retainer 25 is positioned about post 24 and engages annular shoulder 27. A spring 18 is carried between spring retainers 28 and 25 and is compressible therebetween. The sub-assembly also includes a seal 30 which is carried about primary piston 14 adjacent an annular wall 42. The primary piston 14 includes an extending shaft which integrally forms a push rod 9. Optionally, the push rod 9 is formed as a separate component adapted to engage the primary piston 14 as is conventionally known in the art.

Secondary piston 16 is also carried in bore 15 forward of primary piston 14. Secondary piston 16 is engaged by spring retainer 28 of the primary piston sub-assembly. Secondary piston 16 includes extension 37 which carries a spring retainer 26 adjacent annular shoulder 45. A seal 31 is carried on secondary piston 16 adjacent annular wall 48. Secondary piston 16 also includes a secondary seal 33 which is carried in groove 49 providing fluid separation between primary high pressure chamber 21 and secondary low pressure chamber 22.

A compensation port 40 extends between reservoir 11 and primary low pressure chamber 20 in bore 15 rearward of seal 30. Primary low pressure chamber 20 is closed by primary piston 14 which carries seal 30 and by seal 36. Seal 36 is retained in bore 15 by a retaining ring 46 and sealingly engages push rod 9 of primary piston 14. A by-pass hole 43 extends between reservoir 11 and primary high pressure chamber 21 in bore 15 forward of seal 30.

In a similar manner, a compensation port 41 extends between reservoir 11 and secondary low pressure chamber 22 in bore 15 rearward of seal 31. Secondary low pressure chamber 22 is closed along bore 15 by seals 31 and 33. Additionally, a by-pass hole 44 extends between reservoir 11 and secondary high pressure chamber 23 in bore 15 forward of seal 31.

Body 12 includes a port 52 which communicates with primary high pressure chamber 21 and a port 54 which communicates with secondary high pressure chamber 23. The rearward end of body 12 includes an annular extension 56 which extends through power booster wall 8 within opening 57. A power booster spring 51 is positioned around extension 56 and bears against power booster wall 8. The shaft of primary piston 14 extends through opening 57 in power booster wall 8 integrally forming push-rod 9 for operating the primary piston 14.

The forward end of master cylinder body 12 engages an end plate 58 which includes an access opening 60 corresponding to port 52, providing a means for connecting to the vehicle's hydraulic braking circuit (not illustrated) and includes an extension 59 which extends into bore 15. A spring 34 extends between extension 59 and spring retainer 26 on secondary piston 16 through secondary high pressure chamber 23. The extension 59 includes a groove 62 which carries an annular seal 63 providing a fluid-tight seal between the end plate 58 and the master cylinder body 12 closing the forward end of secondary high pressure chamber 23.

Figure 2:
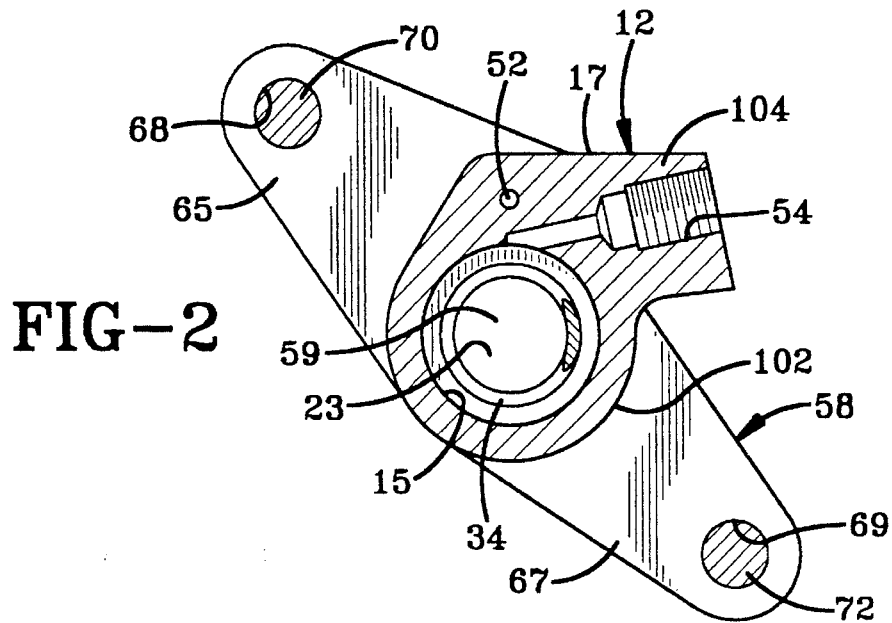
FIG. 2 is a cross sectional view taken generally through the plane indicated by the line 2—2 in FIG. 1.

Referring to FIG. 2, the end plate 58 is shown in complete form and includes two lobes 65 and 67 which extend from opposing sides of extension 59. Lobes 65 and 67 include openings 68 and 69 respectively, which receive rods 70 and 72 respectively. Rod 72, as is shown in FIG. 1, includes a threaded portion 75 provided to receive a nut 78 for securing the end plate 58 on the master cylinder body 12. The rod 72 extends parallel to master cylinder body 12 and in this case, through power booster wall 8 for attachment to the vehicle's structure.

According to an aspect of the present invention, this construction is readily applicable for use in combination with a power booster as disclosed in U.S. patent application Ser. No. 08/486439, entitled "Power Booster with Guided Power Piston" which was filed Jun. 8, 1995 and is commonly assigned. U.S. patent application Ser. No. 08/486439 is specifically incorporated herein by reference.

With a construction for use in combination with such a rod supported power booster, the rods 70 and 72 extend completely through the power booster assembly for attachment to the vehicle structure and provide a means of carrying reaction forces which are applied to the master cylinder assembly.

Referring to FIG. 1, illustrated in combination with the body 12 is reservoir 11 which comprises a closed container for carrying a supply of braking fluid defined by an exterior wall 80 that includes an internal cavity 82. The internal cavity 82 is divided into primary chamber 83 and secondary chamber 84 by internal wall 85. A filler neck 87 is integrally formed with exterior wall 80 and provides a fill opening 88 to the internal cavity 82 that is normally closed by a conventional vented cap assembly (not illustrated).

Figure 3:
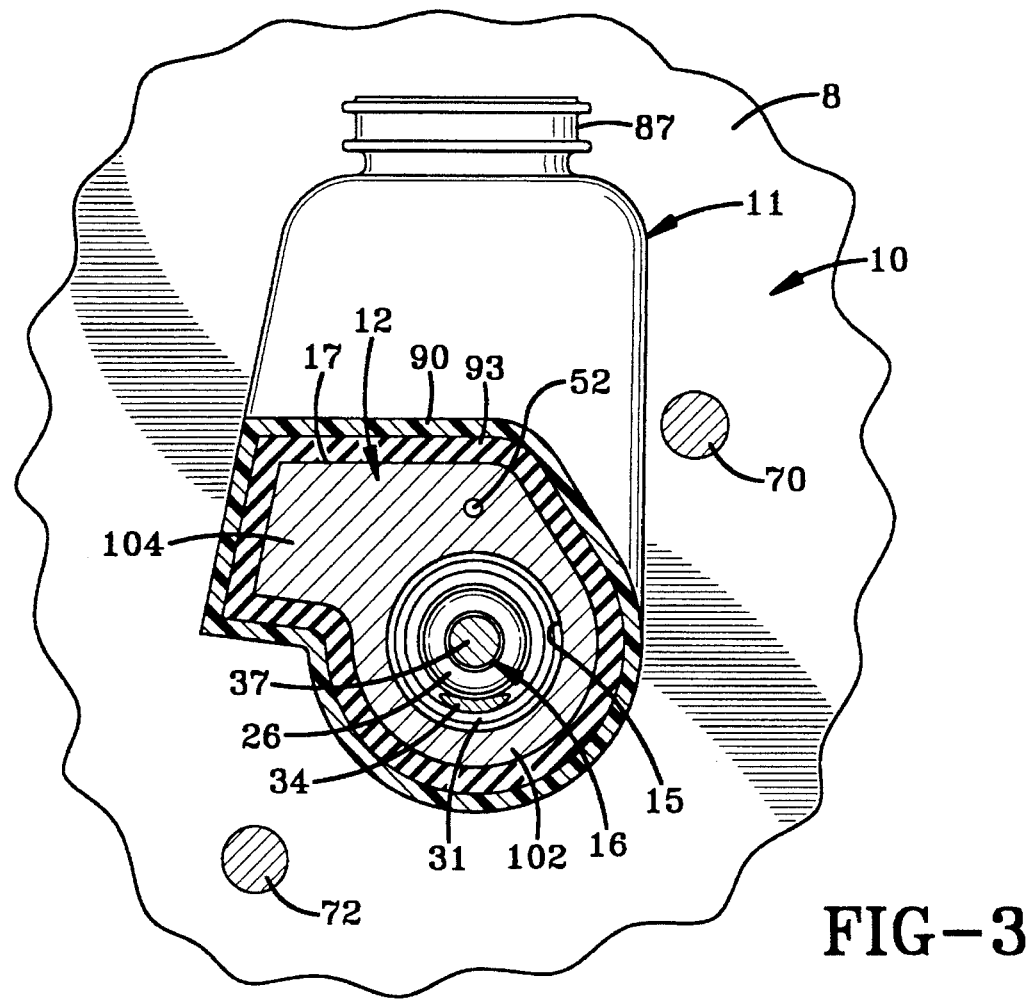
FIG. 3 is a cross sectional view taken generally through the plane indicated by the line 3—3 in FIG. 1.

The external wall 80 includes integrally formed channels 90 and 92 which carry seals 93 and 94 respectively. The internal wall 85 is integrally formed with the external wall 80 and defines a channel 95 which carries a seal 96. The three seals 93, 94 and 96 each include a semi-circular portion and a leg portion formed therewith, as shown by the seal 93 in FIG. 3, with the shape being designed to mate with that of the body 12. The channels 90, 92 and 95 provide an opening into which master cylinder body 12 is received within reservoir 11 and the seals 93, 94 and 96 provide a fluid-tight seal between the reservoir 11 and the master body 12.

The external wall 80 of reservoir 11 is optionally connected to power booster wall 8 by a conventional means (not illustrated), to prevent relative movement therebetween. The external wall 80, in the area of channel 90, is also optionally fixed in position on the master cylinder body 12 to prevent relative motion therebetween by a conventional means such as a retainer 97. Optionally, the external wall 80 extends completely to the end plate 58 in a manner similar to that shown in FIG. 5, and is retained on body 12 by the end plate 58.

Referring to FIG. 2, the cross section of the master cylinder body 12 is visible as being defined by the semi-circular portion 102 and the leg portion 104. This cross section, including the bore 15, comprises a readily extrudable form with a consistent cross section along the length of the master body 12. The port 54 extends through the leg portion 104 and interconnects with the master cylinder bore 15 providing a means of communication between the secondary high pressure chamber 23 and the brake's hydraulic system (not illustrated). Also visible is a portion of the port 52 which extends through the master cylinder body 12.

Figure 4:
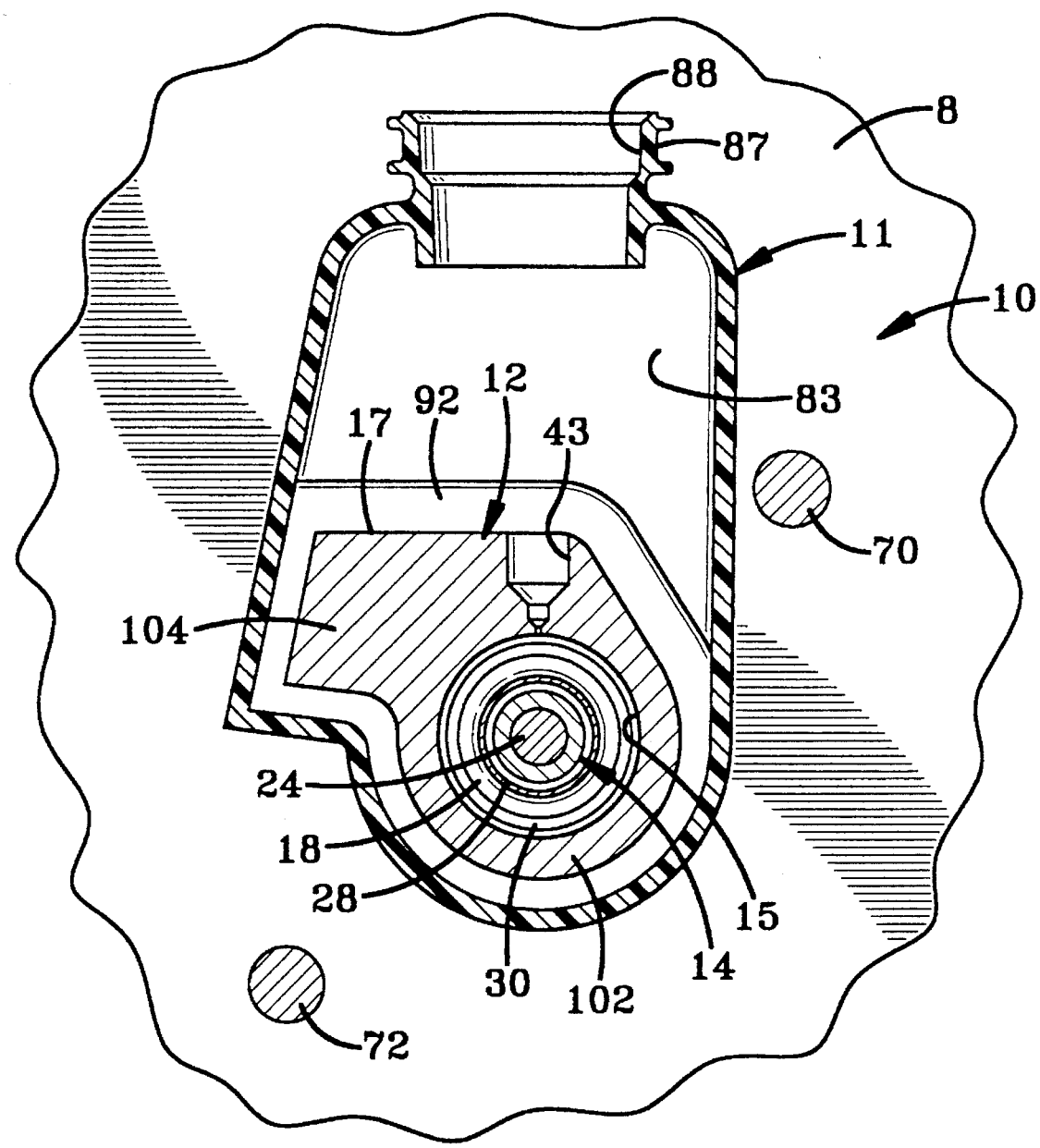
FIG. 4 is a cross sectional view taken generally through the plane indicated by the line 4—4 in FIG. 1.

Referring to FIG. 4, the reservoir 11 is shown as it completely surrounds the cross section of body 12. The by-pass hole 43 is visible which extends through the body 12 and provides a means of communication between the reservoir 11 and the bore 15. The cross sectional profile of the body 12 as defined by the outer perimeter 17 is substantially consistent due to the extruded construction. This permits sliding the body 12 into the reservoir 11 to engage the three seals 93, 94 and 96 and provide a fluid tight assembly.

Through means of the foregoing structure, a relatively simple master cylinder assembly is provided which is relatively inexpensive in construction and provides a means through which the input force to the master cylinder and the reaction created thereby, is transferred to the end plate 58 and into the vehicle structure through the rods 70 and 72. The rods 70 and 72 are optionally part of a power booster assembly or a second end plate is provided, at the opposite end of the master cylinder body from the end plate 58, with the rods 70 and 72 extending between the two end plates.

Figure 5:
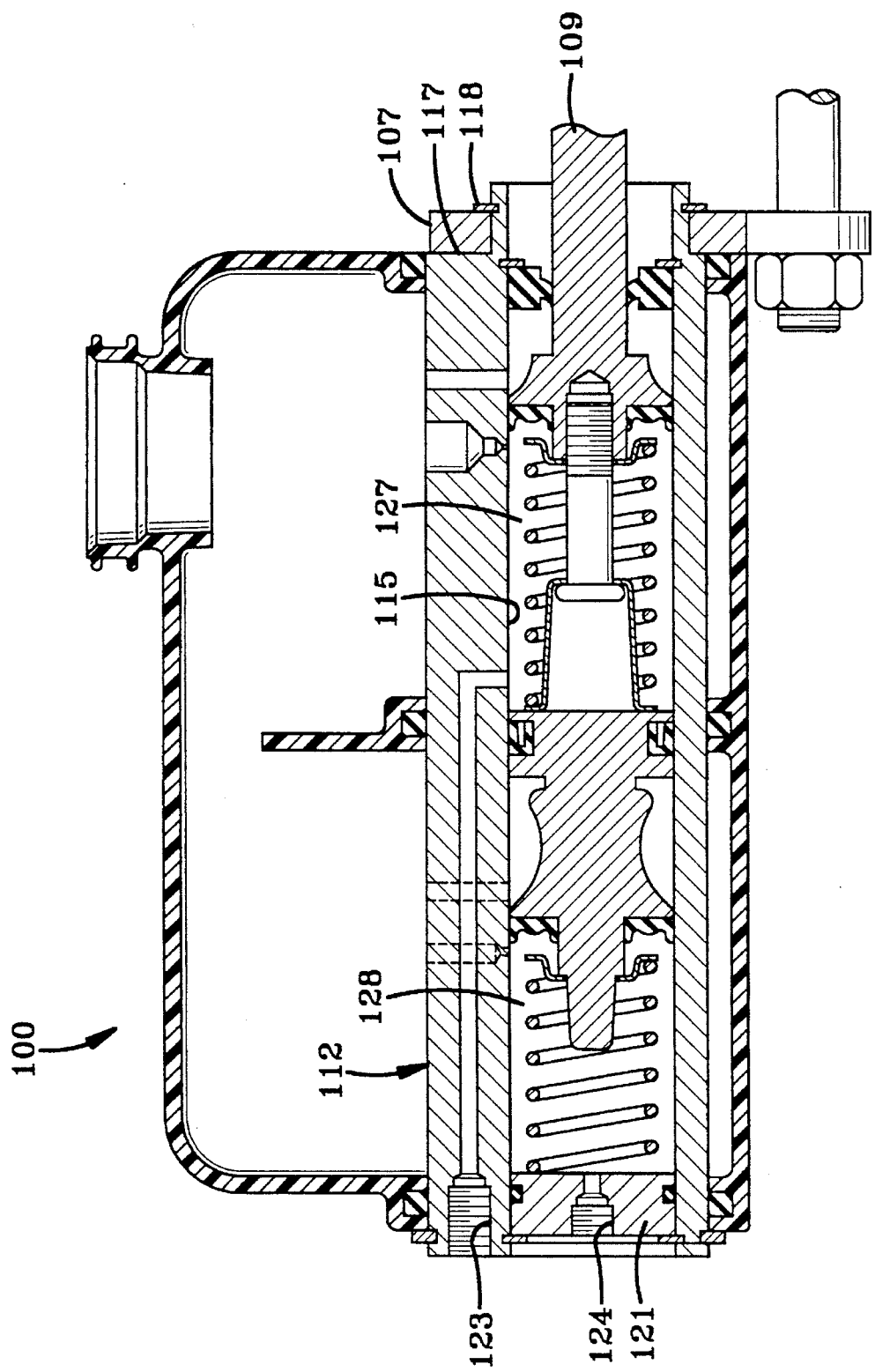
FIG. 5 is a cross sectional view of a master cylinder.

Illustrated in FIG. 5 is a further embodiment of the present invention wherein master cylinder 100 includes an end plate 107 that is provided at the right-hand end of master cylinder body 112. End plate 107 includes an opening for push-rod 109. In this optional construction, the end plate is connected to the right hand of the extruded body 112 by being captured against shoulder 117 by retainer 118. The left end of bore 115 is closed by a plug 121 rather than providing a second end plate. The right end plate 107 is adapted to be mounted adjacent to a power booster or to the vehicle's structure.

The master cylinder 100 includes a port 123 in the master cylinder body 112 that communicates with primary high pressure chamber 127. Also included is a port 124 through plug 121 that communicates with secondary high pressure chamber 128. Through ports 123 and 124 brake fluid is communicated to two independent braking channels.

What is claimed is:

1. A master cylinder comprising:

a body having a longitudinal bore and a substantially constant cross sectional profile with a first end and a second end;

an end plate sealingly closing the first end of the body;

a reservoir slidingly received over the master cylinder body and sealingly engaging the master cylinder body; and a tie rod engaging the end plate and extending substantially parallel to the master cylinder body from the first end.

2. A master cylinder comprising:

a body having a longitudinal bore and a substantially constant cross sectional profile with a first end and a second end;

an end plate sealingly closing the first end of the body;

a seal disposed in the bore near the second end forming an annular opening;

a push-rod extending through the annular opening of the seal into the bore;

a reservoir slidingly received over the master cylinder body and sealingly engaging the master cylinder body; and a tie rod engaging the end plate and extending substantially parallel to the master cylinder body.

3. A master cylinder according to claim 2 further comprising a piston slidably carried in the bore wherein the push-rod is part of the piston.

4. A master cylinder according to claim 2 wherein the second end includes an annular extension projecting from the body coaxially disposed with the annular opening.

5. A master cylinder according to claim 2 wherein the body includes a port opening parallel to the bore and wherein the end plate includes an access opening communicating with the outlet opening.

6. A master cylinder according to claim 2 further comprising three seals sealingly engaging the body wherein the reservoir includes three channels corresponding in shape to the profile of the body the three channels containing the three seals.

* * * * *